United States Patent Office 3,381,018
Patented Apr. 30, 1968

3,381,018
VAPOR PHASE CONVERSION OF BENZOFURAN TO BENZOTHIOPHENE
Harold M. Foster, Middlesex, N.J., assignor to Mobil Oil Corporation, a corporation of New York
No Drawing. Filed Dec. 20, 1965, Ser. No. 515,207
3 Claims. (Cl. 260—330.5)

ABSTRACT OF THE DISCLOSURE

Benzofuran or a lower alkyl ($C_1$–$C_4$) or hydroxyl substituted benzofuran is converted to the corresponding benzothiophene by contacting it and hydrogen sulfide in the vapor phase with oxides and sulfides of Groups VI–B and VIII (Iron subgroup) metals, at temperatures between about 500° C. and about 750° C.

---

This invention relates to the preparation of benzothiophene and its derivatives. It is more particularly concerned with the catalytic vapor phase conversion of benzofurans to benzothiophenes.

As is well known to those familiar with the art, benzothiophene is an intermediate in manufacture of thioindigoid dyestuffs. Ring-substituted derivatives, such as 4-hydroxybenzothiophene, are intermediates for making a very effective class of pesticides. Thus, typical methods for converting 4-hydroxybenzothiophene to benzothienyl carbamate pesticides are set forth in copending application Ser. No. 487,333 filed Sept. 14, 1965, now U.S. Patent No. 3,288,673, a continuation-in-part of application Ser. No. 427,089, filed Jan. 21, 1965, now U.S. Patent No. 3,288,808, a continuation-in-part of application Ser. No. 334,581, filed Dec. 30, 1963, now abandoned, a continuation-in-part of application Ser. No. 220,073, filed Aug. 28, 1962 now abandoned.

It is the discovery of this invention that benzothiophenes and certain derivatives thereof can be prepared from benzofurans in a vapor phase process.

Accordingly, it is an object of this invention to provide a process for preparing benzothiophenes and derivatives thereof. A specific object is to provide a vapor phase process for converting benzofurans to benzothiophenes. Other objects and advantages of this invention will become apparent to those skilled in the art from the following detailed description.

This invention provides a process for producing benzothiophenes that comprises contacting, in the vapor phase, hydrogen sulfide and a benzofuran reactant having the formula:

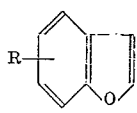

wherein R is selected from the group consisting of H, lower alkyl ($C_1$–$C_4$), and OH, with a catalyst selected from the group consisting of the oxides and sulfides of Groups VI–B and VIII (Iron subgroup) metals, at a temperature between about 500° C. and about 750° C.

The benzofuran reactant is benzofuran or a lower alkyl ($C_1$–$C_4$) or hydroxyl substituted benzofuran. Typical reactants are benzofuran, 4-hydroxybenzofuran, 7-methylbenzofuran, 6-propylbenzofuran, 5-isobutyl benzofuran, and 5-hydroxybenzofuran.

In the process of this invention an excess over the stoichiometric amount of hydrogen sulfide is used. In practice, the molar ratio of hydrogen sulfide to the benzofuran reactant will be between about 3:1 and about 10:1.

The process can be carried out in the vapor phase at temperatures between about 400° C. and about 750° C. The greatest selectivity, however, appears to occur at temperatures between about 600° C. and about 650° C. The benzofuran reactant is charged at an LHSV (liquid volume per volume of catalyst per hour) of between about 0.5 and about 1.0. The process proceeds readily at atmospheric pressures, although superatmospheric pressure can be employed. The process can be operated batchwise, but continuous operation is preferred, recycling unreacted benzofuran reactant to extinction.

The catalysts used in the vapor phase process of this invention are oxides and sulfides of metals of Groups VI–B and VIII (Iron subgroup) of the Periodic Chart of the Elements. Within the contemplation of this invention, the catalytic metal oxide or sulfide can be complexed or combined with other metal oxides. Typical complexes are the so-called metal chromites, which are complexes of metal oxide $Cr_2O_3$. The Periodic Chart referred to is that appearing on pages 56 and 57 of Lange's Handbook of Chemistry, Tenth Edition (1961), published by Handbook Publishers, Inc., Sandusky, Ohio. Accordingly, the catalysts utilizable include $Cr_2O_3$, $MoS_3$, $MoO_3$, $WO_3$, $WS_3$, $Fe_2O_3$, $Fe_2S_3$, $Ni_2O_3$, $Ni_2S_3$, $Co_2O_3$, $CuO \cdot Cr_2O_3$, and $ZnO \cdot Cr_2O_3$. Excellent yields have been obtained using the catalysts alone, without carriers or extenders. However, these catalysts can be supported on inert supports, such as Alundum, pumice, α-alumina, or such active supports as activated alumina. It is preferred to have at least about 10 weight percent catalytic oxide or sulfide when using supported catalysts.

The following general procedure was used in carrying out runs in accordance with this invention: The benzofuran reactant was pumped to a vaporizer wherein it was vaporized in a stream of preheated hydrogen sulfide. The vaporized benzofuran reactant and hydrogen sulfide were then preheated to a temperature within a few degrees of the desired reaction zone temperature, in a preheater zone. The hot gas mixture was then passed through the catalyst zone which is maintained at the desired reaction temperature.

Example 1

Using the foregoing general procedure with a catalyst bed of 39 ml. $Cr_2O_3$ (19%) on alumina, three runs at different temperatures were carried out using benzofuran. Pertinent process data and results are set forth in the table.

Example 2

Using the foregoing general procedure with a catalyst bed of 39 ml. $MoS_3$, three runs were carried at different temperatures using benzofuran. Pertinent process data and results are set forth in the table.

Example 3

Using the foregoing general procedure with a catalyst bed of $CuO \cdot Cr_2O_3$, three runs at different temperatures were carried out with 4-hydroxybenzofuran and $H_2S$. The molar ratio of $H_2S$ to 4-hydroxybenzofuran was 6:1. This run was carried out at an LHSV of 1.3 and pressure of 250 p.s.i.g. Under these conditions, the following yields were obtained.

| T, ° C. | Conversion, Percent | Percent Yield of 4-hydroxybenzothiophene |
|---|---|---|
| 400 | 31 | 8 |
| 500 | 52 | 7 |
| 600 | 73 | 5 |

TABLE

| Example | Reaction Temp., °C. | Benzofuran Feed, ml./min. | H₂S Rate, ml./min.¹ | Contact Time, sec. | Percent Conversion | Percent Selectivity² |
|---|---|---|---|---|---|---|
| 1 | 518–522.5 | 0.83 | 286 | 2 | 20 | 85 |
| 1 | 632.5–640 | 0.8 | 254 | 2 | 65 | 90 |
| 1 | 724.5–728.5 | 0.72 | 229 | 2 | ³30 | 80 |
| 2 | 522–523.5 | 0.9 | 286 | 2 | 12 | 95 |
| 2 | 630–631 | 0.7 | 254 | 2 | 12 | 95 |
| 2 | 728–738 | 0.6 | 229 | 2 | 16 | 80 |

¹ Measured at 25° C.
² For benzothiophene.
³ Probably due to catalyst aging.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A process for producing benzothiophenes that comprises contacting, in the vapor phase, hydrogen sulfide and a benzofuran reactant having the formula:

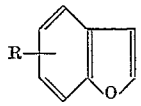

wherein R is selected from the group consisting of H, lower alkyl, and OH, with a catalyst selected from the group consisting of MoS₃, WS₃, Fe₂S₃, Ni₂S₃, and CuO·Cr₂O₃, at a temperature between about 400° C. and about 750° C.

2. A process for producing benzothiophene that comprises contacting, in the vapor phase, hydrogen sulfide and benzofuran with MoS₃, at a temperature between about 400° C. and about 700° C.

3. A process for producing 4-hydroxybenzothiophene that comprises contacting, in the vapor phase, hydrogen sulfide and 4-hydroxybenzofuran with CuO·Cr₂O₃, at a temperature between about 400° C. and about 75° C.

References Cited

UNITED STATES PATENTS 2,424,483   7/1947   Middleton et al. ____ 260—330.5

FOREIGN PATENTS 963,385   8/1962   Great Britain.
6,402,271   9/1965   Netherlands.

OTHER REFERENCES

Hartough, Thiophene and its Derivatives (1952) p. 50.
Sabatier, Catalysis in Org. Chem. (1923) items 675, 676, 702.
Berkman, Catalysis (1940) p. 656.

NORMA S. MILESTONE, *Acting Primary Examiner.*

WALTER A. MODANCE, *Examiner.*

C. M. SHURKO, *Assistant Examiner.*

UNITED STATES PATENT OFFICE

CERTIFICATE OF CORRECTION

Patent No. 3,381,018                      April 30, 1968

Harold M. Foster

It is certified that error appears in the above identified patent and that said Letters Patent are hereby corrected as shown below:

Column 4, line 16, "75° C." should read -- 750° C. --.

Signed and sealed this 9th day of September 1969.

(SEAL)

Attest:

Edward M. Fletcher, Jr.                      WILLIAM E. SCHUYLER, JR.

Attesting Officer                              Commissioner of Patents